United States Patent [19]

Cerny et al.

[11] 4,187,207

[45] Feb. 5, 1980

[54] FLAMEPROOFED POLYAMIDE CONTAINING RED PHOSPHOROUS

[75] Inventors: Jacqueline Cerny, Lyons; Robert Troncy, Oullins, both of France

[73] Assignee: Rhone-Poulenc Industries, Paris, France

[21] Appl. No.: 840,634

[22] Filed: Oct. 11, 1977

[30] Foreign Application Priority Data

Oct. 11, 1976 [FR] France .................................. 76 31308

[51] Int. Cl.$^2$ ................................................. C08K 3/40
[52] U.S. Cl. .................................. 260/37 N; 260/45.7; 260/45.75 W; 525/2
[58] Field of Search ................ 260/45.75 W, 45.7 PE, 260/841, 37 N

[56] References Cited

U.S. PATENT DOCUMENTS

| | | | |
|---|---|---|---|
| 3,344,107 | 9/1967 | Miller | 260/37 N |
| 3,778,407 | 12/1973 | Hild et al. | 260/45.7 PE |
| 3,808,289 | 4/1974 | Okuhashi et al. | 260/45.7 P |
| 3,847,861 | 11/1974 | Largman et al. | 260/45.7 PE |
| 3,882,076 | 5/1975 | Largeman et al. | 260/45.7 PE |
| 3,883,475 | 5/1975 | Racky et al. | 260/45.7 PE |
| 4,092,284 | 5/1978 | Theysohn et al. | 260/45.7 PE |
| 4,092,460 | 5/1978 | Cerny et al. | 260/45.7 PE |

*Primary Examiner*—V. P. Hoke
*Attorney, Agent, or Firm*—Burns, Doane, Swecker & Mathis

[57] ABSTRACT

Polyamides flameproofed with red phosphorous and including cadmium oxide as an additive to retard the formation of phosphine during heating are disclosed. The polyamides are particularly useful in the manufacture of electrical components.

6 Claims, No Drawings

FLAMEPROOFED POLYAMIDE CONTAINING RED PHOSPHOROUS

BACKGROUND OF THE INVENTION

1. Field of the Invention

The present invention relates to new compositions based on polyamide, flameproofed with red phosphorus, which are intended in particular for the manufacture of articles for the electrical or electronics industry.

2. Description of the Prior Art

It is known that the addition of red phosphorus to polyamide-based compositions makes it possible to achieve a high degree of flameproofing. (French Patent Application published under No. 2,218,364). However, the use of red phosphorus presents a serious disadvantage, namely the liberation of phosphine during the heating which accompanies the moulding of the polymer. It is also known that it is possible to restrict this disadvantage by incorporating into the compositions certain substances which fix the phosphine, such as the compounds of the group $MoS_2$, $PbO_2$, $AgNO_3$, $HgCl_2$, $FeCl_3.6H_2O$, $CuO$ or active charcoal, (the abovementioned French patent application, which particularly recommends the use of copper oxide and active charcoal).

It has also been proposed to further improve the result obtained with these oxides by coating the red phosphorus with various polymers.

In fact, the use of the abovementioned products, and in particular of copper oxide, makes it possible considerably to reduce the liberation of phosphine. On the other hand, the polyamides which are flameproofed with red phosphorus and contain copper oxide exhibit a rather low arcing resistance (in terms of Standard Specification NF/C 26,220) and their use in the manufacture of components which are intended for the electrical or electronics industries is therefore not recommended.

SUMMARY OF THE INVENTION

New polyamide-based compositions have now been found which, on the one hand, exhibit an excellent flame-resistant character without the emission of phosphine at the operating temperatures and, on the other hand, lead to articles which exhibit a high arcing resistance. These compositions which are flameproofed with red phosphorus are characterised in that they contain cadmium oxide. More precisely, the compositions according to the invention contain, in addition to the polyamide, (in percentage by weight of the composition), 0.2 to 25% of red phosphorus and 0.2 to 20% of cadmium oxide.

DETAILED DESCRIPTION OF THE INVENTION

It is possible, within the invention, to use the different types of polyamides obtained by polycondensation of diacids and of diamines or by homopolycondensation of aminoacids or also by polymerisation of lactams. As examples of polyamides of this kind, there may be mentioned very particularly the polyhexamethylene adipamides and the polycaprolactams.

The expression "red phosphorus", in the sense of the present invention, denotes the various coloured allotropic varieties of phosphorus (namely red, violet or black phosphorus) which are commercially available under the name of red phosphorus.

The amount of red phosphorus is preferably between 1 and 10% by weight of the composition. In general, it is desirable to use the red phosphorus in a finely divided form, for example, in the form of particles of an average diameter which does not exceed $200\mu$, for example, of between 1 and $100\mu$. With regard to the cadmium oxide, both the amorphous variety and the crystalline variety can be used. Whichever variety is employed, an anhydrous oxide is preferably used in order to prevent the liberation of water during use.

The cadmium oxide is preferably used in the form of particles of an average diameter which does not exceed $100\mu$, for example, of between 1 and $100\mu$.

The compositions according to the invention can be prepared by simple dry mixing of the various constituents. This mixing can be carried out at ordinary temperature, by means of the mechanical devices which are usually employed.

These compositions have been defined above by their essential constituents. It goes without saying that these compositions can be modified without going outside the scope of the invention. Thus, with regard, for example, to the red phosphorus, the latter can either be used as it is, or particles of red phosphorus which are coated with a polymer film can be used. Amongst these polymers, there may be mentioned especially the phenol-formaldehyde prepolycondensates of the novolac type.

Moreover, the compositions can contain various adjuvants; they can thus contain reinforcing or gelling fillers, such as glass fibers or asbestos fibres, glass microspheres, kaolin, talc, silica, micas, bentonites or bentones. Amongst the abovementioned fillers, glass fibres are most commonly used. These fibres generally have an average diameter of between 1 and $10\mu$ and a length of between 2 and 6 mm.

In order to obtain articles possessing optimum mechanical properties, it is advantageous to use fibres which are sized, for example, with epoxy resins, polyester resins, polyurethanes or vinyl polymers.

When the compositions according to the invention contain especially glass fibre fillers, the proportion of the fillers can vary between 20 and 50% relative to the weight of the composition.

Other adjuvants can also be used, such as lubricants, stabilisers, agents for improving impact resistance, pigments or dyestuffs, antistatic agents, and crystallising agents; these last additives and their use are widely described in the literature.

The compositions according to the invention can be converted into finished or semi-finished articles by the application of the usual injection or extrusion techniques. As has been indicated, one of the advantages of these compositions lies in the fact that this conversion, which is generally carried out at a temperature of the order of 200° to 320° C., is not accompanied by the emission of phosphine into the atmosphere. The articles obtained are fire-resistant, on exposure to a flame do not lead to the formation of droplets of molten material which may be burning, and exhibit an excellent arcing resistance (according to Standard Specification NF/C 26,220). Although the fields of use of these articles are very varied, articles of this kind are thus particularly suitable for uses in the industries concerned with electricity (namely the electrical, electronics, household electrical appliance, radio and automobile industries).

The following examples illustrate the invention:

EXAMPLE 1

Into a mechanical mixer, there are introduced 4,375 g of a mixture (compound), based on polyhexamethylene adipamide, having an average molecular weight of 20,000 and a viscosity index of 145 (determined according to Standard Specification ISO R 307) and containing 30% by weight of glass fibre, 100 g of cadmium oxide and 525 g of red phosphorus in the form of a powder coated with a phenol-formaldehyde prepolycondensate. This coating process is carried out as follows:

2,250 g of a red phosphorus powder having an average particle size of 20 to 30μ are intimately mixed, at 25° C., with 1,500 g of a phenol-formaldehyde prepolycondensate powder, which has a melting point of about 80° C. and a molecular weight of 800. The mixture is then poured, at a thickness of about 1 cm, onto plates covered with aluminium foil. The whole is placed in an oven at 130° C. for 3 hours. Sheets are obtained and are broken into fragments. It is found that the edges do not release red phosphorus powder on rubbing and that the phosphorus particles have been coated. The composition comprising the polyamide, the cadmium oxide and the coated phosphorus is then introduced into a single-screw laboratory extruder of which the screw has a diameter of 45 mm and a length of 900 mm. This extruder is equipped with a cylindrical die having a diameter of 3 mm.

The temperatures are as follows: 250°–260° C. in the feed zone, 270°–275° C. in the melting and compression zones and 260° C. at the die.

The throughout of the machine is 15 kg/hour.

The strand obtained is granulated and is stored so as to be protected from moisture.

Samples of air are taken with a DRAEGER CH 31,101 tube above the die, above the feed hopper and near the granulator. The phosphine content is observed to be less than 0.1 ppm. Test pieces of 127×12.7×1.6 mm are injection-moulded between 270° and 290° C. and are subjected to the Underwriters Laboratories UL 94 vertical test (as described in document 9750-1 of the Bureau de Normalisation des Matières Plastiques) in order to measure the degree of flameproofing. Classification 94 VO is obtained.

Small plates of 100×100×3 mm are injection-moulded between 270° and 280° C. Test pieces of 50×50 mm are cut out of these small plates in order to measure the tracking resistance index according to Standard Specification NF C 26,220.

An index of more than 450 volts is obtained.

EXAMPLE 2

The process is carried out as indicated in Example 1 but with the following amounts of products: 4,300 g of the same polyamide which does not contain glass fibres, 675 g of red phosphorus, coated with the phenol-formaldehyde prepolycondensate, and 25 g of cadmium oxide.

No liberation of phosphine is found during the use of the composition. The classification is UL VO, the product does not flow and the tracking index is 500 volts.

We claim:

1. A composition of matter comprising a polyamide, an amount of red phosphorous sufficient to flameproof said polyamide and an amount of cadmium oxide sufficient to retard the liberation of phosphine during heating of said polyamide.

2. The composition as defined by claim 1, containing 0.2 to 25% red phosphorous and 0.2 to 20% cadmium oxide by weight based upon the total weight of the composition.

3. The composition as defined by claim 1, further comprising reinforcing fillers selected from the group consisting of glass fibers, asbestos fibers, glass microspheres, kaolin, talc, silica, micas, bentonites and bentones, 4. The composition as defined by claim 3, wherein said reinforcing fillers are glass fibers present in quantities from 20 to 50% by weight based upon the total weight of the composition.

5. The composition as defined by claim 1, wherein the red phosphorous is in the form of particles coated with a phenol-formaldehyde prepolycondensate.

6. A shaped article comprising the composition of claim 1.

* * * * *